US007824622B2

(12) United States Patent
Horn et al.

(10) Patent No.: US 7,824,622 B2

(45) Date of Patent: Nov. 2, 2010

(54) MOLDED PART FOR THE ANALYSIS AND PREPARATION OF SUBSTANCES IN MICROLITER AND SUBMICROLITER VOLUMES AND PROCESS FOR THE PREPARATION THEREOF

(75) Inventors: Anton Horn, Jena (DE); Barbara Horn, legal representative, Jena (DE); Thomas Moore, Jena (DE); Renate Bublitz, Jena (DE); Helga Endmann, Jena (DE); Ronny Henke, Jena (DE)

(73) Assignee: Cybio AG, Jena (DE)

( * ) Notice: Subject to any disclaimer, the term of this patent is extended or adjusted under 35 U.S.C. 154(b) by 888 days.

(21) Appl. No.: 10/564,190

(22) PCT Filed: Jul. 8, 2004

(86) PCT No.: PCT/EP2004/051416

§ 371 (c)(1),
(2), (4) Date: Jun. 19, 2006

(87) PCT Pub. No.: WO2005/005047

PCT Pub. Date: Jan. 20, 2005

(65) Prior Publication Data

US 2006/0275176 A1 Dec. 7, 2006

(30) Foreign Application Priority Data

Jul. 10, 2003 (EP) ................................ 03015777

(51) Int. Cl.

| | |
|---|---|
| ***B01L 99/00*** | (2010.01) |
| ***B01L 3/02*** | (2010.01) |
| ***B32B 5/18*** | (2006.01) |
| *B01D 15/08* | (2006.01) |
| *G01N 21/00* | (2006.01) |

(52) U.S. Cl. .......................... 422/101; 422/56; 422/58; 422/61; 422/100; 428/402; 428/403; 428/407; 428/613; 210/500.1; 210/656

(58) Field of Classification Search ....................... None
See application file for complete search history.

(56) References Cited

U.S. PATENT DOCUMENTS

| | | | | |
|---|---|---|---|---|
| 6,416,716 | B1 * | 7/2002 | Shukla et al. | 422/101 |
| 7,153,572 | B2 * | 12/2006 | Cooper et al. | 428/402 |

FOREIGN PATENT DOCUMENTS

| | | |
|---|---|---|
| WO | WO 98/37949 | 9/1998 |
| WO | WO 2005/005047 | 1/2005 |

OTHER PUBLICATIONS

European Patent Office, *Search Report*, Application No. 0301577.0-2113, dated Dec. 10, 2003, pp. 3.

PCT *International Search Report*, PCT/EP2004/051416, dated Oct. 22, 2004, pp. 3.

PCT, Written Opinion of the International Searching Authority, International Preliminary report on Patentability Translation, PCT/EP2004/051416, mailing date Aug. 6, 2006.

* cited by examiner

*Primary Examiner*—Jill Warden
*Assistant Examiner*—Neil Turk
(74) *Attorney, Agent, or Firm*—Thompson Hine LLP

(57) ABSTRACT

An integral molded part of a plastic material for the analysis and preparation of substances, having at least one surface region and an interior region, wherein said at least one surface region is an open-pore three-dimensional network.

9 Claims, 14 Drawing Sheets

Nylon-6,6 tip
Formic acid 85%, 30 seconds

A = wet B = dry

Nylon-6 flexible tube
Aqueous phenol solution (saturated)

A = dry

B = wet

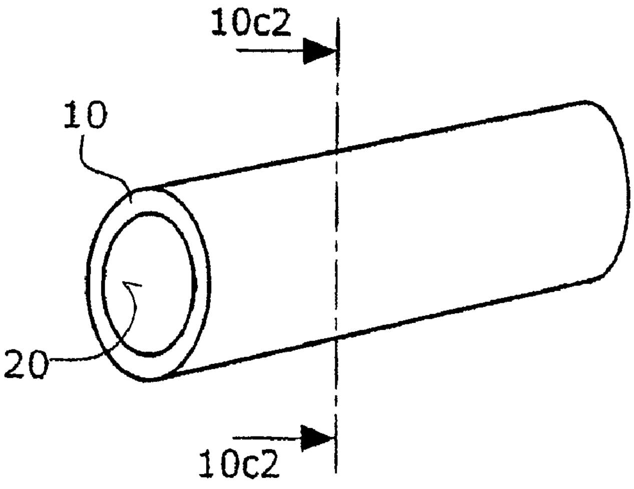
Fig.10c
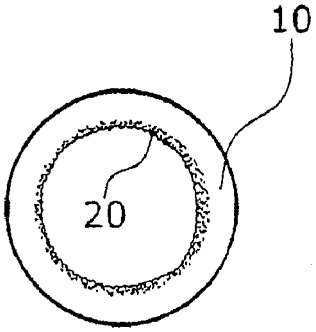
Fig.10c2
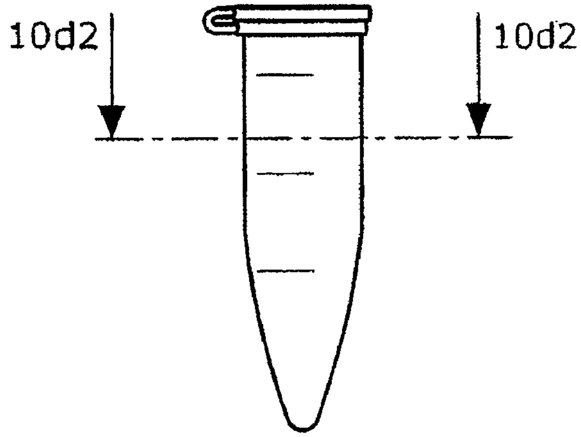
Fig.10d
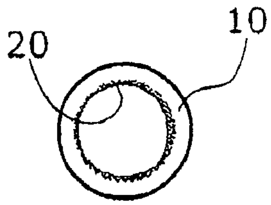
Fig.10d2

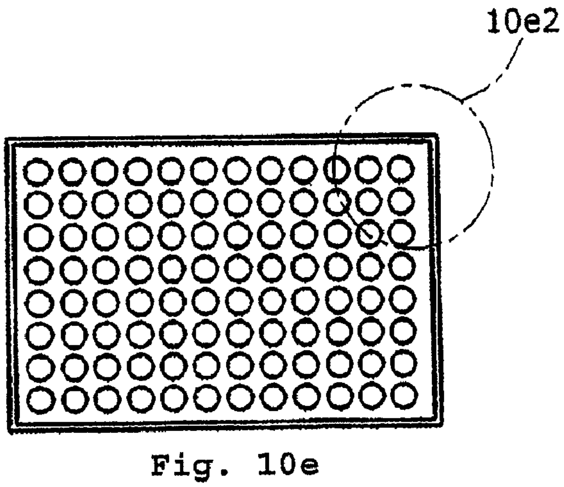
Fig. 10e
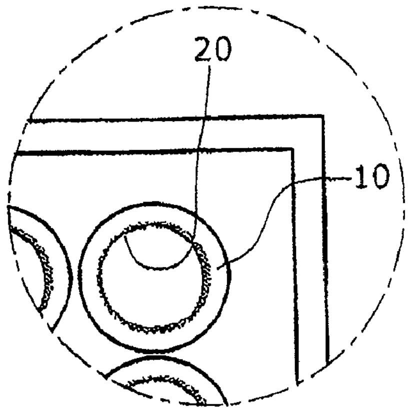
Fig. 10e2
Fig.10f
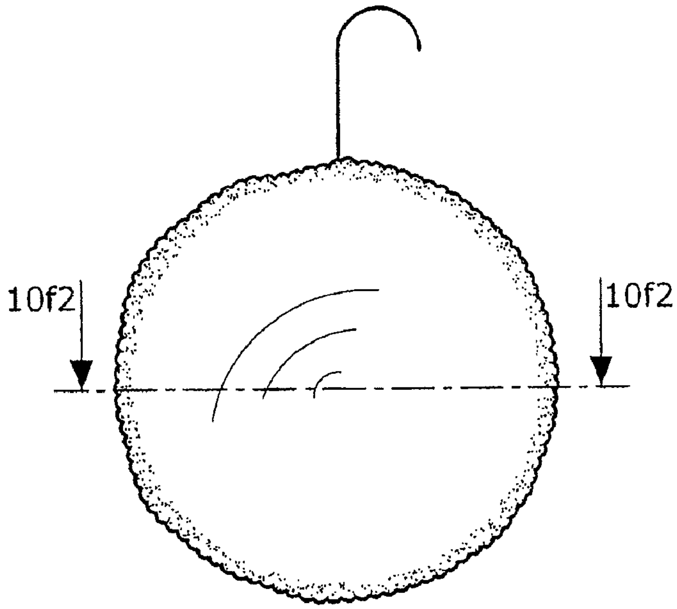
Fig.10f2
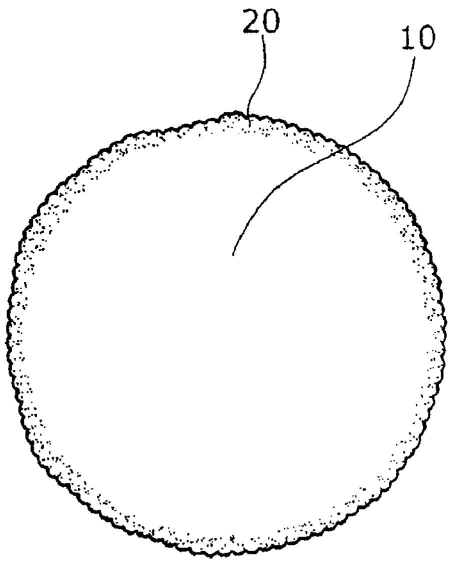

Fig.10g2

MOLDED PART FOR THE ANALYSIS AND PREPARATION OF SUBSTANCES IN MICROLITER AND SUBMICROLITER VOLUMES AND PROCESS FOR THE PREPARATION THEREOF

The present invention relates to a molded part for the analysis and preparation of substances.

The development of biotechnology in recent years, especially in the field of proteome and genome research, requires efficient analytics while the sample and reagent volumes are generally reduced. Due to the increasing parallelization of the assays, there are high demands in terms of a simple, practical and economically reasonable sample preparation to allow the characterization of ultrasmall amounts.

A wide variety of requirements must be met by the corresponding sample preparation steps, wherein:

a) the losses of sample material must be kept low;

b) it must be possible to establish a failure-safe automatization;

c) analyses of low concentration analytes must be possible in the presence of other, high concentration analytes;

d) sample volumes in the µl and sub-µl range must be processable;

e) units for a wide variety of methods which can be employed as universally as possible must be created.

U.S. Pat. No. 5,833,927 relates to a device by which a component can be bound from a liquid. The device is designed in the form of a pipette tip. The binding is to a membrane which is provided within the pipette tip at an oblique angle to the direction of flow.

WO 88/09201 relates to a device for the separation and purification of molecules by adsorbing the molecules to a matrix, wherein a chromatographic material is enclosed within a pipette tip.

Drawbacks of these devices are their having large dead volumes, which are unacceptable especially when sample volumes in the microliter and submicroliter ranges are handled, and their being composed of different materials.

To overcome the problem of the dead volume, WO 98/37949 describes a process for producing a structure which is provided within an enclosure, for example, a pipette tip. This structure may serve as a sorptive or reactive support, but the placement of the structure within the outlet of the pipette tip results in severe functional disorders and a poor reproducibility.

WO 01/07162 tries to circumvent these problems by applying a coating to the inner surface of a pipette tip. However, disadvantageously, the pipette tip and the coating are made of two different materials.

U.S. Pat. No. 6,416,716 tries to solve the problem of poor reproducibility and the poor outflow of WO 98/37949 by incorporating parts of a separation medium into the wall of a vessel. However, it is also disadvantageous that different materials must be combined.

With the increasing downsizing of the reaction vessels, pipette tips etc., it becomes increasingly complicated to introduce a second material.

Brazilian J. Med. Biol. Res. (1994), 27: 1507-1516, describes a process in which spheres of nylon-6 are dissolved in formic acid and then precipitated whereby spongy structures and colloidal suspensions can be obtained. Enzymes may then be bound thereto. The corresponding sponges and suspensions are difficult to process into practical tools for microanalytics.

It is the object of the present invention to provide molded parts for analysis and preparation which meet the mentioned requirements while they overcome the drawbacks of the prior art.

This object is achieved by an integral molded part of a plastic material for the analysis and preparation of substances, having at least one surface region and an interior region, wherein said at least one surface region is an open-pore three-dimensional network.

"Integral" within the meaning of the application means that the molded part consists of one chemically unitary starting material.

"Interior region" is the portion of the molded part which is not part of a surface region.

According to the invention, a molded part of a plastic material is provided which is suitable for the analysis and preparation of substances. On its surface, there is at least one region with an open-pore three-dimensional network. The molded parts are suitable for the treatment of samples in the microliter and submicroliter ranges.

Preferably, the interior region is free of open pores.

Particularly suitable plastic materials for the molded parts include polyamides, for example, of the types PA6, PA66, PA46, PA12, polysulfones, polyesters and polycarbonates. Copolymers of the corresponding materials and mixtures thereof are also possible. However, the molded part as a whole is integral and made of the same chemical material.

Reactants may be bound to the respective molded parts.

Particularly suitable reactants include:

proteins, protein derivatives and peptides, e.g., antibodies, antigens, lectins, heparins, protein A, protein G, enzymes, such as proteases, phosphatases, glycosidases, lipases etc.;

nucleic acids, e.g., oligo- and polynucleotides, DNA or RNA fragments;

carbohydrates, such as monosaccharides, disaccharides, glycogen, starch, dextrans and complex carbohydrates;

lipids, such as triacylglycerols, steroids, phosphoglycerids, gangliosides;

affinity ligands, e.g., chelating agents, Cibacrone Blue;

effectors of enzymes, such as inhibitors, activators, substrates, cosubstrates.

The corresponding reactants may be bound to one or more surface regions of the molded part. Also, different reactants may be bound to different surface regions.

The preparation of multifunctional layers by the repeated partial activation of the surface of a molded part and its providing with different reactants allows a sequence of successive reactions in the microliter region without tedious intermediate steps. Thus, for example, in a pipette tip, a covalently bound protease in the lower layer could produce peptides, which are removed from the reaction solution by hydrophobic binding in the overlying layer and can be examined in a mass spectrometer after being eluted. This is shown in FIG. 10 where reactants, for example reactant 1, reactant 2, and react 3, are provided on an integral molded part (A, B) having an interior region 10 and an open-pore three-dimensional network 20.

The reactants can be bound by covalent or ionic binding, by complex formation or through hydrophobic interaction. The binding can be effected directly or by means of linkers. For example, the molded part may be designed as a pipette tip, piece of flexible tubing, rod, single or multiple vessel, microtitration plate, immersed body sphere or plate, as shown in FIG. 10 A-G, having an interior region 10 and an open-pore three-dimensional network 20.

The invention also relates to a process for the preparation of the molded parts. Thus, an integral molded part of a plastic material is partially dissolved on at least one surface region to form an open-pore surface region which forms a three-dimensional network. A chemical activation of the surface region may be effected simultaneously with, before or after said partial dissolving of the surface region.

The process is characterized in that the plastic surface is partially dissolved by a liquid reaction medium, and that the partially dissolved surface structure is preserved by changing the liquid medium, or a three-dimensional structure is formed by precipitation. This results in a considerable increase of surface area, which may be utilized for binding substances.

According to expectation, the exact process conditions depend on the plastic material employed and can be optimized for any given material by simple experimentation. If it is desired that the surface is only partially dissolved, particularly suitable solvents, for example, for polyamides are a saturated aqueous phenol solution or 85% formic acid. If further reactive groups are to be released simultaneously, acids such as hydrochloric acid (>2.5 M) are suitable, in particular.

The duration of action depends, inter alia, on the surface material, any previous surface treatment and the temperature. It is generally within a range of from 10 s to 10 min, preferably within a range of from 30 s to 3 min. In the case of a desired release of further reactive groups on the surface by cleaving bonds within the plastic material, the duration of action is typically from 1 to 10 hours, preferably from 2 to 3 hours. After these reaction media have acted on the surface region or regions, the reaction media conditions are changed. This may be done by changing the reaction medium or by changing the concentration by adding further substances.

In the case of molded parts suitable for receiving liquids (for example, pipette tips, reaction vessels, microtitration plates, flexible tubes), the necessary reaction medium can be introduced or aspired in a simple way. In the case of immersed body spheres, rods etc., the surface region to be treated is immersed into the reaction medium.

The molded parts according to the invention are suitable for the analysis and preparation of substances, especially for the specific concentration and sample preparation and for enriching a substance in a sample, for depleting an interfering substance from a sample, for modifying analytes, especially for the specific cleavage or removal of modifications, such as phosphates, sugar moieties, fatty acid moieties.

For example, the technique of extraction from relatively larger vessels and the elution into substantially smaller vessels can achieve concentration of the desired substance in the proportion of the volumes of the extraction to the elution vessels, as shown in FIGS. 11A and 11B with an integral molded part having an interior region 10 and an open-pore three-dimensional network 20.

Extraction from volume $V_1$=500 µl

Elution with volume $V_2$=10 µl results in a 50 fold concentration.

EXAMPLE 1

Activation of a Pipette Tip

A pipette tip consisting of nylon-6,6 was activated by partially dissolving its inner wall with formic acid, followed by precipitating the dissolved nylon-6,6 on the inner wall by diluting the nylon-containing solution with water.

A pipette tip was treated with the following steps:

a) drawing in 15 µl of 85% formic acid;
b) immediately thereafter, also drawing in 4 µl of a saturated sodium chloride solution for diluting the formic acid;
c) incubation at room temperature for 2 min;
d) ejecting the formic acid/sodium chloride solution and thoroughly rinsing with water.

Figure 1:
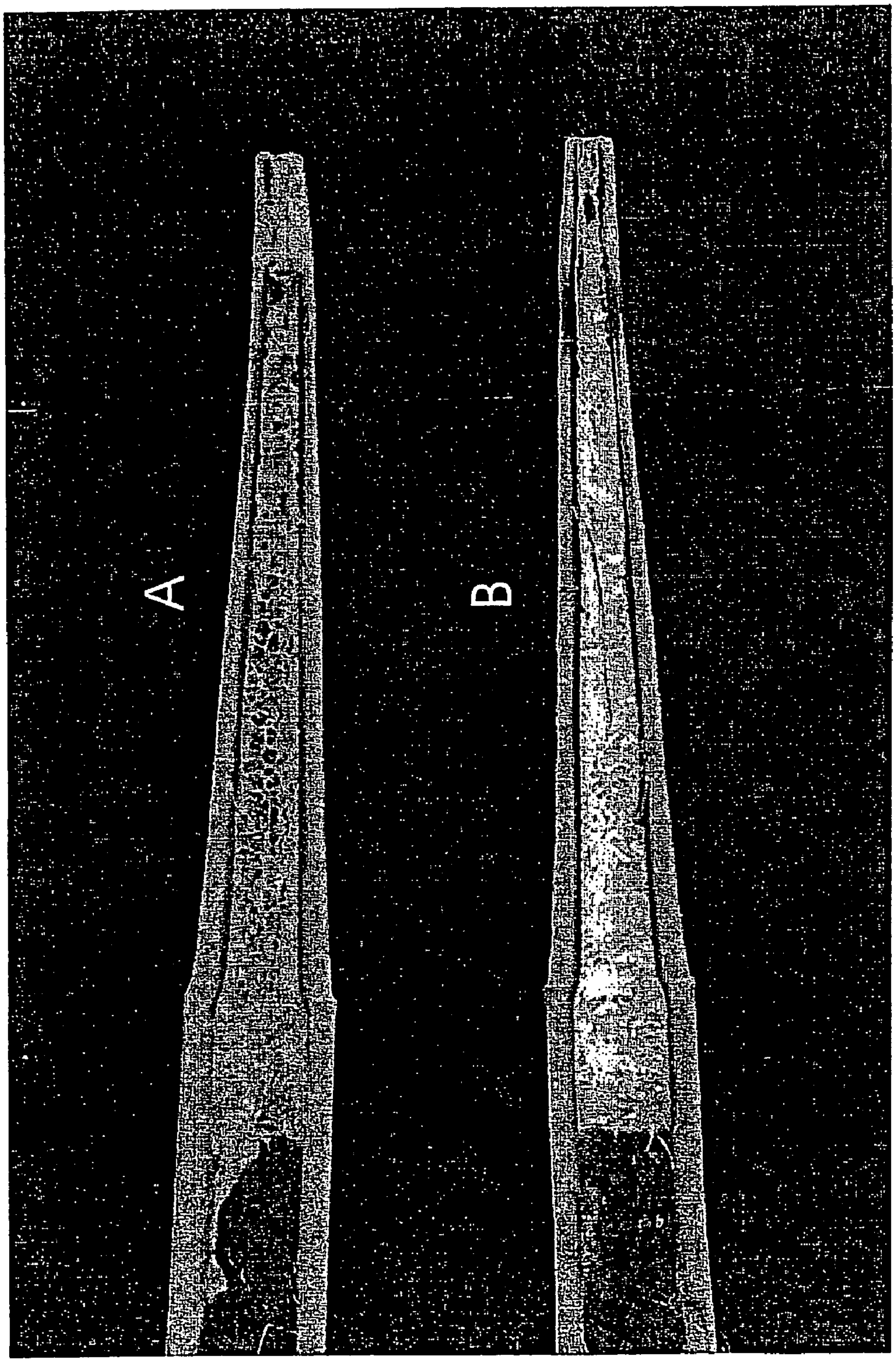
FIG. 1 shows a longitudinal sectional view through a nylon-6,6 tip activated with 85% formic acid (A: wet; B: dry).

A correspondingly treated pipette tip is shown in FIG. 1.

EXAMPLE 2

Activation of a Piece of Flexible Tubing

2a) A nylon flexible tube consisting of nylon-6 was treated by adding an aqueous phenol solution, followed by precipitating the dissolved nylon-6 at the inner wall by adding acetone. The activation was done as follows:

a) drawing in 15 µl of a saturated aqueous phenol solution;
b) incubation at room temperature for 10 min;
c) also drawing in 25 µl of acetone;
d) waiting for 5 min;
e) ejecting the phenol/acetone solution and repeated rinsing with acetone.

Figure 2:
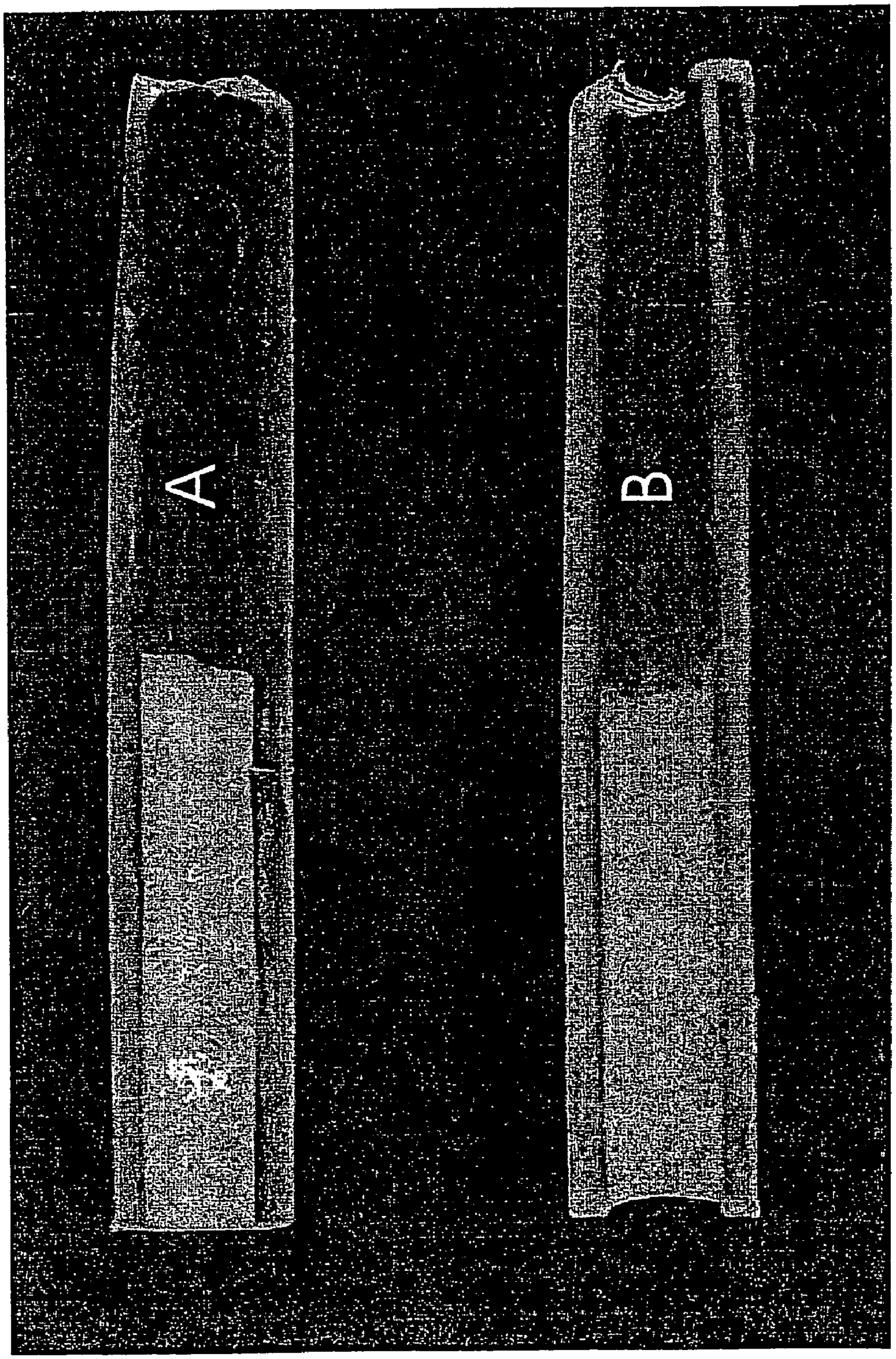
FIG. 2 shows a longitudinal sectional view through a nylon-6 piece of tubing activated with a saturated aqueous phenol solution (A: wet; B: dry).

A correspondingly treated piece of flexible tubing is shown in FIG. 2.

2b) Alternatively, the piece of tubing was activated by:

a) drawing in 10 µl of 85% formic acid;
b) incubation at room temperature for 60 s;
c) ejecting the formic acid and repeated rinsing with water.

EXAMPLE 3

Binding of Protein to Nylon-6,6 Tips

A nylon-6,6 tip was washed with dimethylformamide, 80% acetonitrile and 0.1 M phosphate buffer, pH 8.0, with checking the absorbance at 215 nm, until a maximum absorbance difference of 0.04 was reached. Subsequently, the tip was incubated with a solution of 0.5 mg hemoglobin/ml of phosphate buffer for 2 hours. Then, the remaining concentration of hemoglobin in the solution was measured by photometry at 215 nm, and the amount bound was calculated from the absorbance difference. Under such conditions, no bonding could be detected (0 μg/$cm^2$ of nylon surface in six experiments).

In a second experiment, a nylon tip was activated at first with 15 μl of 85% formic acid at room temperature for 2 min as described in Example 1. This was followed by washing as above. Then, the tip was incubated with hemoglobin as described above. From the decrease in absorbance by hemoglobin at 215 nm, a binding of 18.4 μg/$cm^2$ of surface resulted in four experiments.

In a third experiment, a nylon tip was activated with formic acid as described above. Then, the tip was incubated with 2.9 M hydrochloric acid at 37° C. for 2.5 hours, and washed as above. Hemoglobin was covalently bound to amino groups of nylon through polyethyleneimine spacers with glutaraldehyde. The binding was 26.5 μg/$cm^2$ of surface area (from a determination in duplicate).

A fourth sample was treated like sample 3. Instead of hemoglobin, trypsin was covalently bound to the amino groups of the nylon. The amount of binding of 26.8 μg of trypsin/$cm^2$ was determined from an activity measurement with a fluorogenic substrate.

EXAMPLE 4

Fractionated Separation of Hydrophobic Peptides

Nylon-6,6 tips (25 μl) were partially dissolved with 85% formic acid for 30 s, and the acid was then removed by several washings with water. A mixture of defined peptides was prepared from human serum albumin by cleavage with trypsin. Into the activated tip, 7 μl of a solution with 1.4 μg of peptide mixture in 20 mM ammonium hydrogencarbonate with an addition of trifluoroacetic acid was pipetted, followed by ejection thereof after 5 min of contact time. Subsequently, the tip was washed with 50 μl of an aqueous 0.1% trifluoroacetic acid solution. This was followed by the elution of the bound peptides with 10 μl each of aqueous acetonitrile solution, the content of acetonitrile being increased stepwise from 10% to 50%. The elution solution was examined with MALDI MS. The sequences of the peptides could be determined by comparison with a data base. From the thus obtained amino acid sequence of the identified peptides, the so-called "Gravy index" was calculated as a measure of the hydrophobicity of the peptides.

Figure 3:
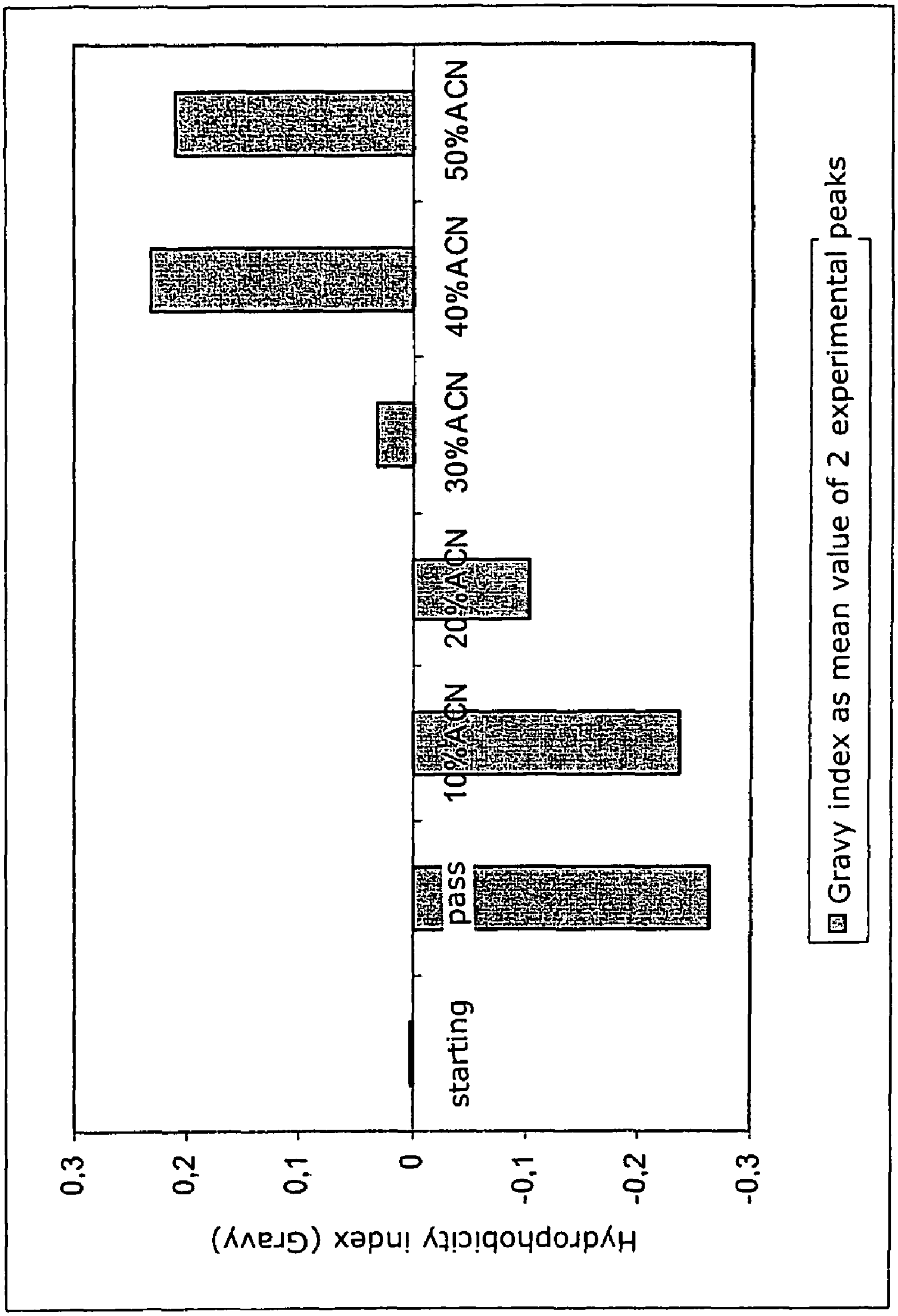
FIG. 3 shows a separation of peptides having different hydrophobicities at an activated nylon-6,6 tip.

The relationship between the "Gravy index" and an increasing acetonitrile concentration is shown in FIG. 3.

EXAMPLE 5

Desalting of a Peptide Mixture

A piece of nylon-6 flexible tubing was activated as described under 2b). The activated nylon tube having a length of 15 mm and an interior diameter of 1.9 mm was placed over a pipette tip and intensively washed with dimethylformamide, 100% acetonitrile and 80% acetonitrile. Then, the flexible tube was equilibrated with 0.1% aqueous trifluoroacetic acid, and 10 μl of a peptide mixture (4.8 nmol/ml, 100 mM sodium chloride, 50 mM phosphate, acidified with TFA) was pipetted. After 5 min of contact time, the solution was pipetted out, and the flexible tube was washed with 10 μl of aqueous 0.1% TFA. The bound peptides were eluted with 10 μl of 80% acetonitrile in water.

Figure 4:
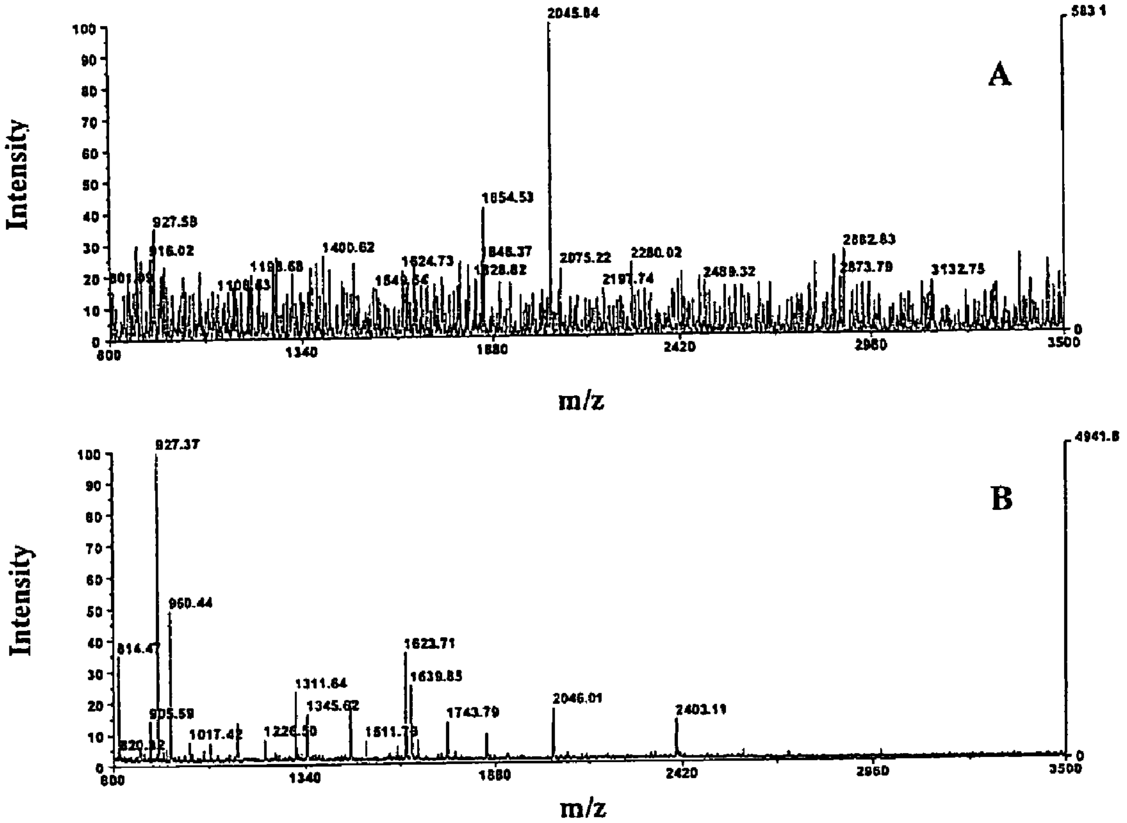
FIG. 4 shows the result of a desalting of a peptide mixture.

FIG. 4A (top part) shows the MALDI MS spectrum before the desalting. FIG. 4B shows the MALDI spectrum after elution of the peptides from the flexible tube.

EXAMPLE 6

Covalent Binding of Trypsin

A nylon-6,6 tip was activated as follows: 10 ml of 80% formic acid and then 1 μl of saturated sodium chloride solution were pipetted into the tip and ejected after 2 min. Then, the tip was rinsed with water repeatedly. Into the thus activated nylon tip, 10 μl of a 2.9 M hydrochloric acid was pipetted and incubated in an atmosphere saturated with water vapor at 37° C. for 2.5 hours in order to partially hydrolyze the acid amide linkages of the nylon. After washing the tip with water and 0.1 M phosphate solution, pH=8.0 (Pa buffer), reaction with glutaraldehyde was performed. Thus, the tip was incubated with 10 μl of 2.5% glutaraldehyde solution (v/v) in Pa buffer at room temperature for 18 min. After intensive washing with water and Pa buffer, the binding of the spacer polyethyleneimine (PEI) is effected by incubation with 10 μl of a 1% PEI solution in Pa buffer (w/v) at 37° C. for 1 hour. After the washing with water and Pa buffer, remaining binding sites were occupied by incubation at 4° C. for at least 2 hours, preferably over night, with 10 μl of an amino acid mixture of 0.5 mg each of phenylalanine, leucine, arginine, glycine and aspartic acid per ml of Pa buffer. This is followed by a second incubation with glutaraldehyde (2.5% in Pa buffer, 18 min at room temperature). After intensive washing with water and Pa buffer, 10 μl of a trypsin solution (1 mg/ml of Pa buffer) is pipetted into the tip and incubated at 4° C. for 23 hours. Washing with Pa buffer is followed by a reduction of the double bonds formed between the aldehyde groups of the glutaraldehyde and the amino groups of the nylon, the PEI or the trypsin with a 0.1 M $NaBH_4$ solution in Pa buffer (30 min at room temperature). Finally, the nylon tip was washed with water, Pa buffer, 1 M NaCl solution in Pa buffer, 0.50/0 octylglycoside in Pa buffer, and Pa buffer. The amount of trypsin bound was determined with the fluorogenic trypsin substrate Bz-Arg-AMC.HCl. Thus, over a period of 2 min each, 10 ml each from a total volume of 150 μl of a substrate solution (25 μM of Bz-Arg-AMC.HCl in 20 mM $NH_4HCO_3$ containing 0.50/0 of n-octylglycoside) was drawn into the pipette with a CyBi-Well Multipipettor and pipetted out with shaking. The AMC formed was measured at 360/440 nm with a fluorescence reader and compared with AMC also measured calibration values. The test yielded an amount of bound trypsin of 5.9 μg.

Figure 5:
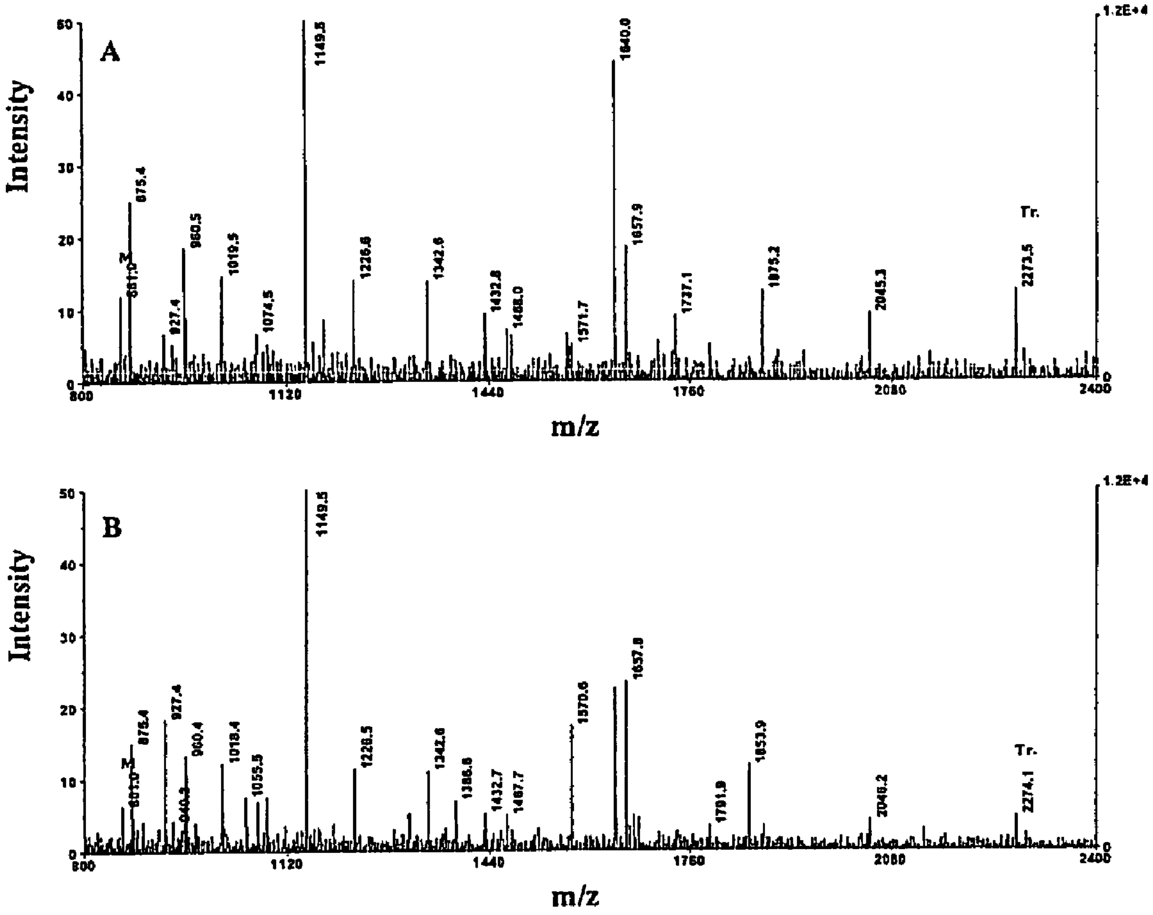
FIG. 5 shows mass-spectroscopic analyses of human albumin after cleavage with trypsin bound to a nylon-6,6 tip.

The tip was repeatedly employed for the digestion of human serum albumin (HSA) solutions of different concentrations. The cleaved peptides were detected in MALDI MS. FIG. 5 shows two MALDI spectra of HSA peptides after 10 min of trypsin digestion. FIG. 5A shows the cleavage result of human albumin in the first use (top), and FIG. 5B in the sixth use. Thus, the tips are sufficiently stable for repeated use.

EXAMPLE 7

Cleavage of a Phosphopeptide with Alkaline Phosphatase

Figure 6:
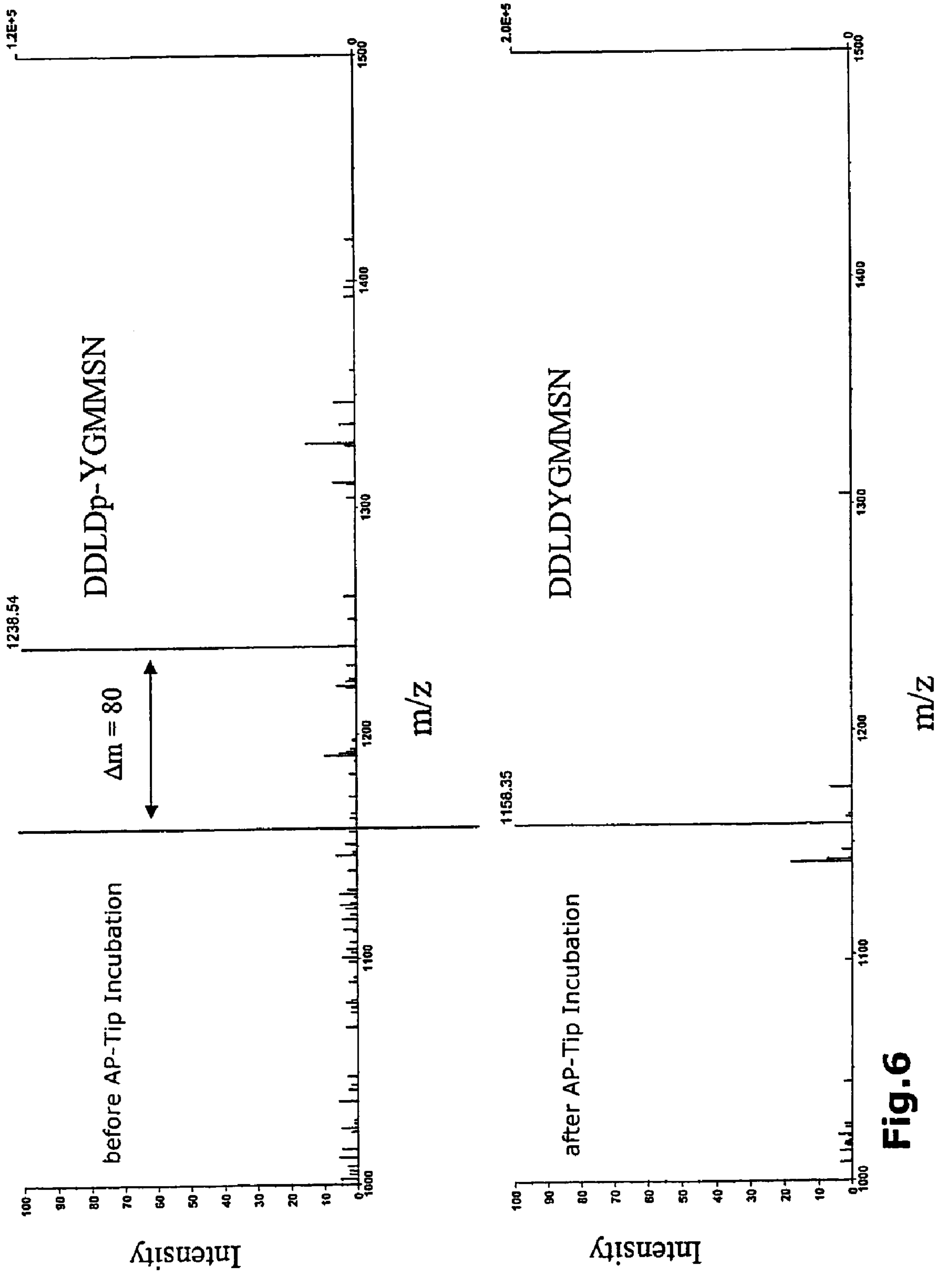
FIG. 6 shows mass-spectroscopic analyses of the cleavage of a phosphopeptide with alkaline phosphatase bound to a nylon-6,6 tip.

To a nylon-6,6 tip, activated by partially dissolving it with 10 μl of 85% formic acid for 30 s and precipitation with water, purified alkaline phosphatase (AP) from calf intestine was covalently bound by analogy with trypsin (Example 6) with slight changes of the procedure. After the second glutaraldehyde activation, the tip was intensively washed with 20 mM $NaHCO_3$ solution instead of the phosphate buffer. The AP was employed for binding as a solution of 1.38 mg/ml in 60 mM $NaHCO_3$. 10 μl of this solution was pipetted into the nylon tip and incubated at 4° C. for 23 hours. After the incubation, the AP solution was pipetted out and later combined with the washing solutions. Then, the tip was washed with 8×10 μl of 25 mM diethanolamine/HCl, pH=9.8 (DEA). In the combined washing solutions, the activity of the AP was determined by photometry with p-nitrophenyl phosphate as a substrate in 1 M DEA, pH=9.8, and compared with the amount of AP employed. From the decrease of the amount of AP, the amount of AP bound to the tip was concluded to be 6.5 μg, knowing its specific activity. The reduction of the double bonds with $NaBH_4$ was effected in 0.1 M $NaHCO_3$. $NaHCO_3$ was also employed for the subsequent washing steps instead of phosphate buffer. The activity of the bound AP in the tip was examined by cleaving a phosphopeptide by means of MALDI MS. Eight μl of a solution of 1.6 μg of a phosphopeptide in 20 mM DEA, pH 9.8, was pipetted into the tip and incubated at room temperature for 5 min. The MALDI spectrum of the negative ions after 5 min of incubation shows that the phosphopeptide (monoisotopic mass of 1238.35 Da) is no longer detectable. The appearance of a new peak (monoisotopic mass of 1158.35 Da) with a mass reduced by 80 Da shows the cleavage of a phosphate group (FIG. 6).

EXAMPLE 8

Cleavage of a Glucopeptide

A nylon-6,6 tip, by analogy with Example 7, was treated as follows:

- incubation with 10 μl of 2.9 M HCl (2.5 hours at 37° C.);
- glutaraldehyde binding (10 μl of 2.5% glutaraldehyde in 0.1 M Pa buffer, pH=8.0, 18 min at room temperature);
- Binding of the PEI spacer (10 μl of 1% PEI solution in 0.1 M Pa buffer, 1 h at 37° C.);
- blocking with an amino acid mixture (10 μl of a mixture of 0.5 mg each of phenylalanine, leucine, arginine, glycine and aspartic acid per ml of Pa buffer, 2 hours at 4° C.);
- glutaraldehyde binding (as above).

To this, PNGase F from the Boehringer company was bound (10 μl with 0.2 U/ml, 23 h at 4° C.). This was followed by a reduction with $NaBH_4$ and washings as described in Example 6 for trypsin binding. The nylon tip was washed thoroughly with Pa buffer after each incubation.

The detection of the binding of enzymatically active PNGase F was effected through the deglycosylation of a glycopeptide, which was purified by chromatography from a typical digest by alkaline phosphatase.

10 μl of a solution of 0.5 μg of the glycopeptide in 10 mM Tris/HCl, pH=8.3, was pipetted into the nylon tip and incubated at room temperature for 20 h.

Figure 7:
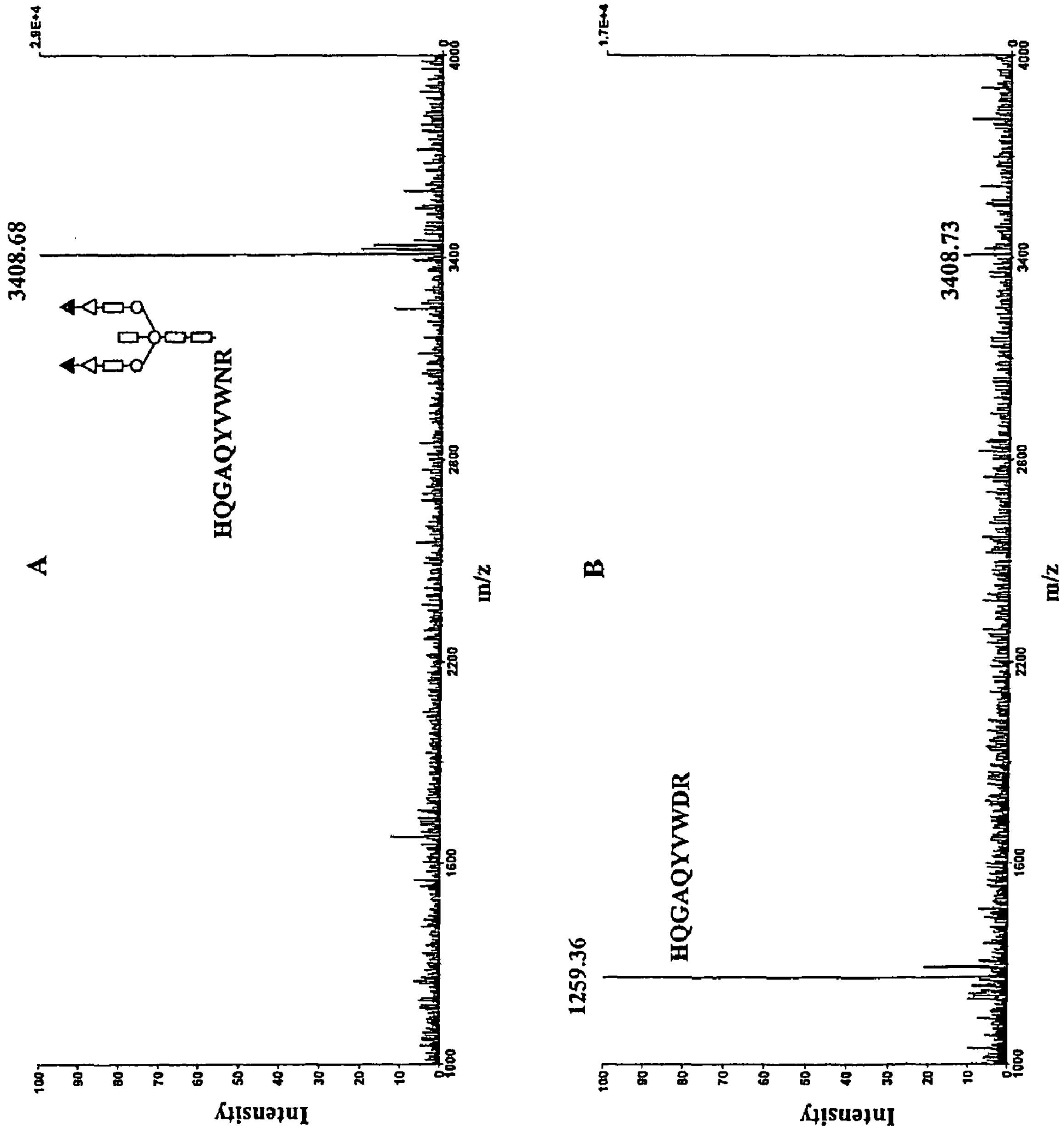
FIG. 7 shows a mass-spectroscopic analysis of a glucopeptide before and after cleavage with peptide N-glucosidase F bound to a nylon-6,6 tip.

FIG. 7 shows the mass spectrum before (7A) and after the incubation (7B). The carbohydrate moieties have been cleaved off.

EXAMPLE 9

Desalting of an Oligonucleotide

Figure 8:
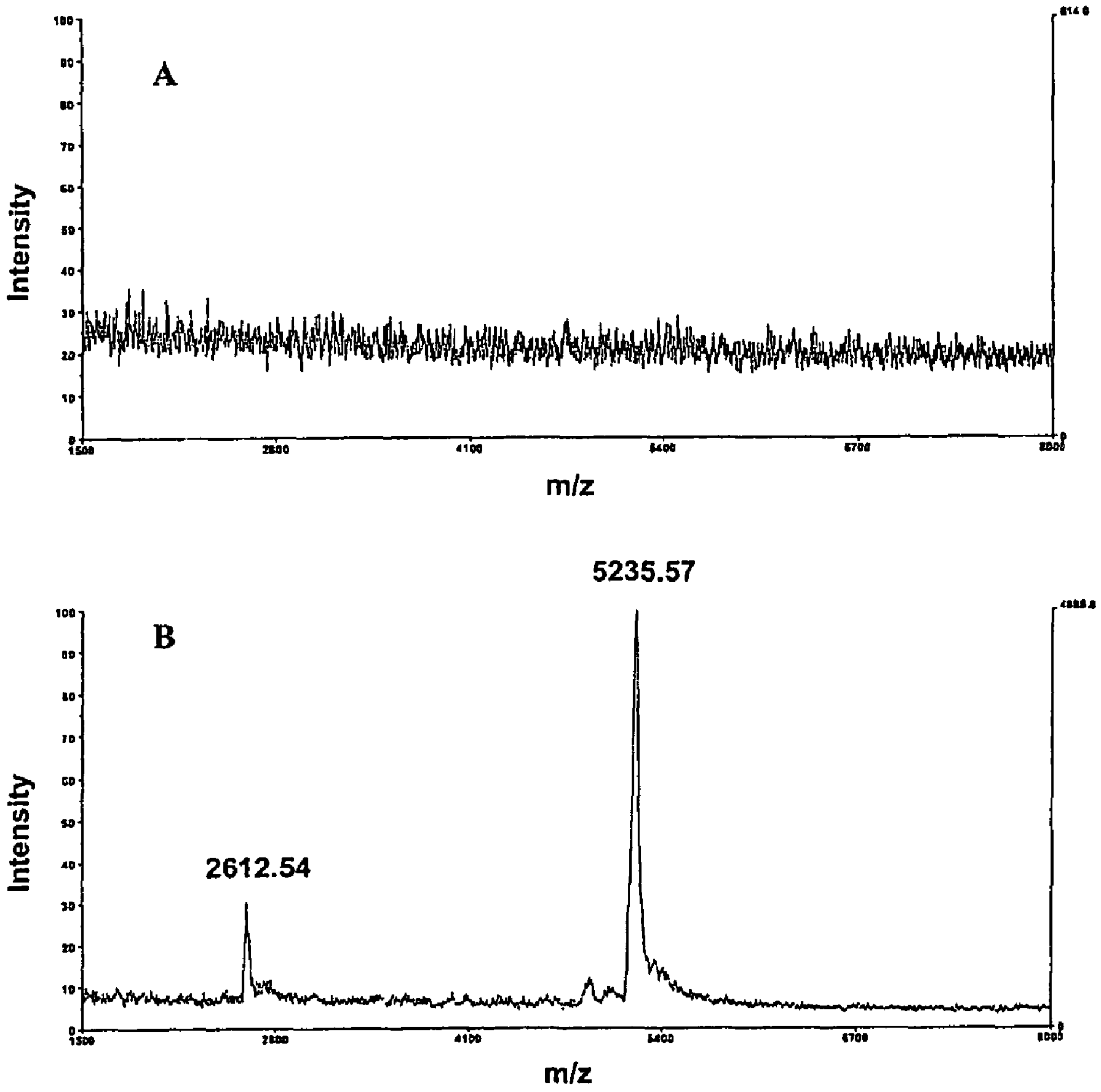
FIG. 8 shows the results of a desalting of a 17mer oligonucleotide solution by means of an activated nylon-6,6 tip.

A nylon tip activated as described in Example 1 was equilibrated with an aqueous 0.1% TFA solution. Then, 10 μl of a solution of a 17mer oligonucleotide (25 pmol/μl) in 5 mM EDTA, 100 mM NaCl, 1 mM $MgCl_2$ and 10% glycerol, pH=5.2, was pipetted into the tip. After 10 min of contact time, the solution was ejected, and the tip was washed with 3×10 μl of aqueous 0.1% TFA solution and 3×10 μl of 0.1% TFA/40% acetonitrile solution. The elution was effected with 6 μl of a solution of 50% acetonitrile, 50 mM $NH_4OH$, pH=9.0. FIG. 8 shows the MALDI spectra of the starting solutions (A) and (B) after desalting at the nylon tip.

EXAMPLE 10

Preparation of a Module for Enriching Phosphopeptides from a Peptide Mixture

1) Preparation of the Module a) Activation with Phenol and Hydrochloric Acid

The module which consists of eight nylon-6-rods was first degreased with chloroform and then immersed 15 mm deep into a saturated aqueous phenol solution for 10 min.

Subsequently, the partially dissolved nylon was precipitated on the rods by immersion into 100% acetone for 5 min, followed by thoroughly rinsing repeatedly with 100% ethanol.

After the rinsing, a further release of reactive groups was effected by incubation with 2.9 M HCl at 37° C. for 2.5 hours, followed by thoroughly rinsing repeatedly with water.

b) Activation with Bisoxirane

The module previously activated with phenol and hydrochloric acid was incubated at 80° C. for 20 hours with constant shaking in 10 ml of a solution of:

- 9 ml of bisoxirane
- 1 ml of 100% ethanol;
- 1 ml of 25 mM aqueous sodium carbonate solution (pH=11), followed by thoroughly rinsing repeatedly with water.

a) Immobilization of Iminodiacetic Acid (IDA)

The module previously activated with bisoxirane was incubated at 50° C. for 20 hours with constant shaking in 10 ml of a solution of:

- 1 g of IDA, dissolved in
- 10 ml of 25 mM aqueous sodium carbonate solution (pH=12), followed again by thoroughly rinsing repeatedly with water.

a) Binding of Copper(II) Ions

The module with the immobilized IDA was incubated at room temperature for 1 hour with constant shaking in 10 ml of a solution of:

- 10 mM copper(II) chloride, dissolved in
- 50 mM Na acetate buffer (pH=5), the 10 ml of solution being replaced after 30 min by 10 ml of the same solution.

2) Use of the Module for Phosphopeptide Enrichment

A nylon rod of the thus prepared module was immersed for about 10 min into 300 μl of a solution of tryptic peptides of human serum albumin (1.28 nmol) and a phosphopeptide (1.8 nmol) in 50 mM MES buffer (N-morpholinoethanesulfonic acid), pH=5.5, with 10% acetonitrile (ACN). The rod was washed three times with 170 μl each of 45.5 mM MES buffer, pH 5.5, in 400% ACN, and twice with water. Thereafter, elution was performed with 30 μl of a 1% $NH_4OH$ solution in 40% ACN.

Figure 9:
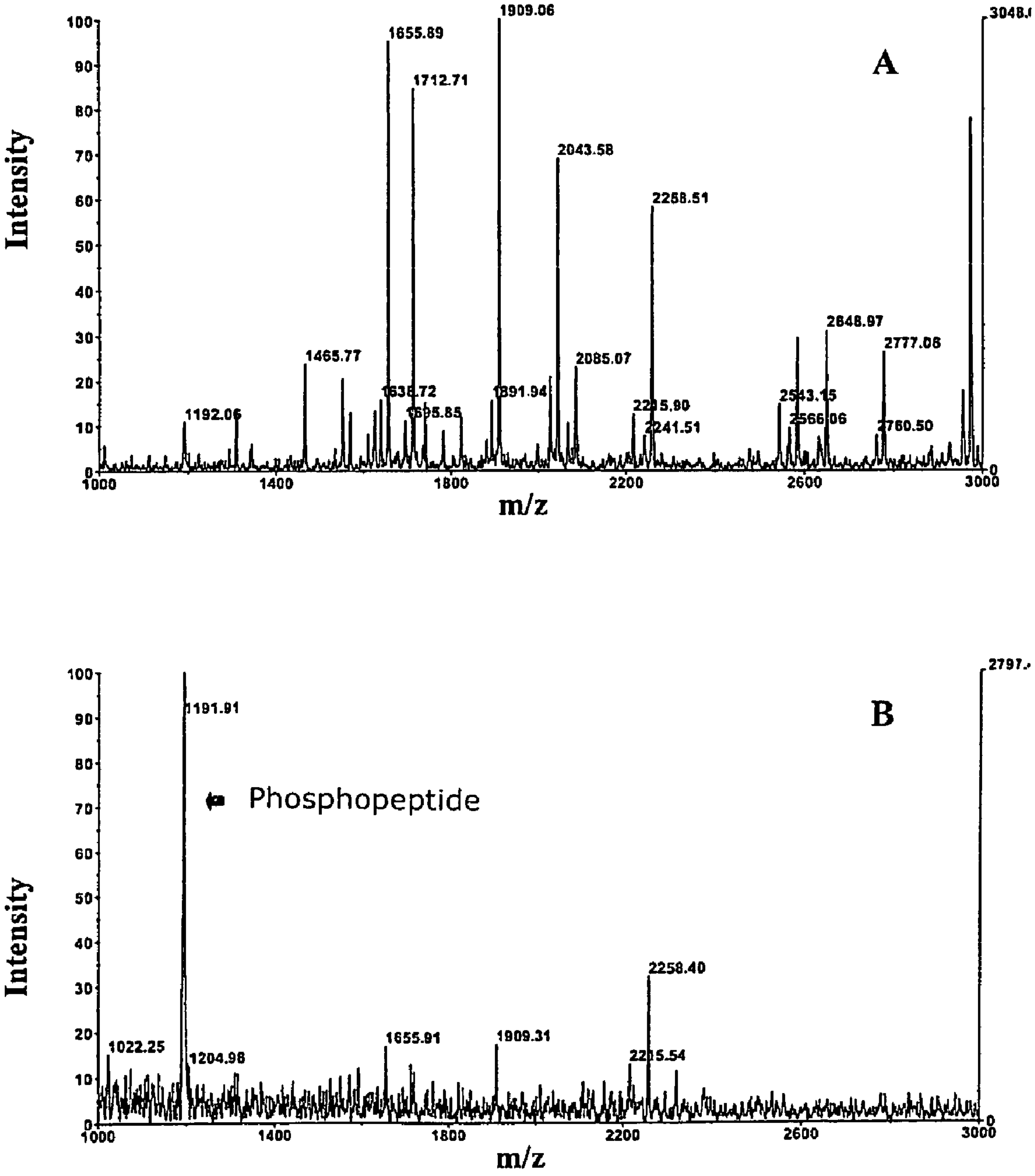
FIG. 9 shows the results of enriching phosphopeptides from a solution.
Figure 10:
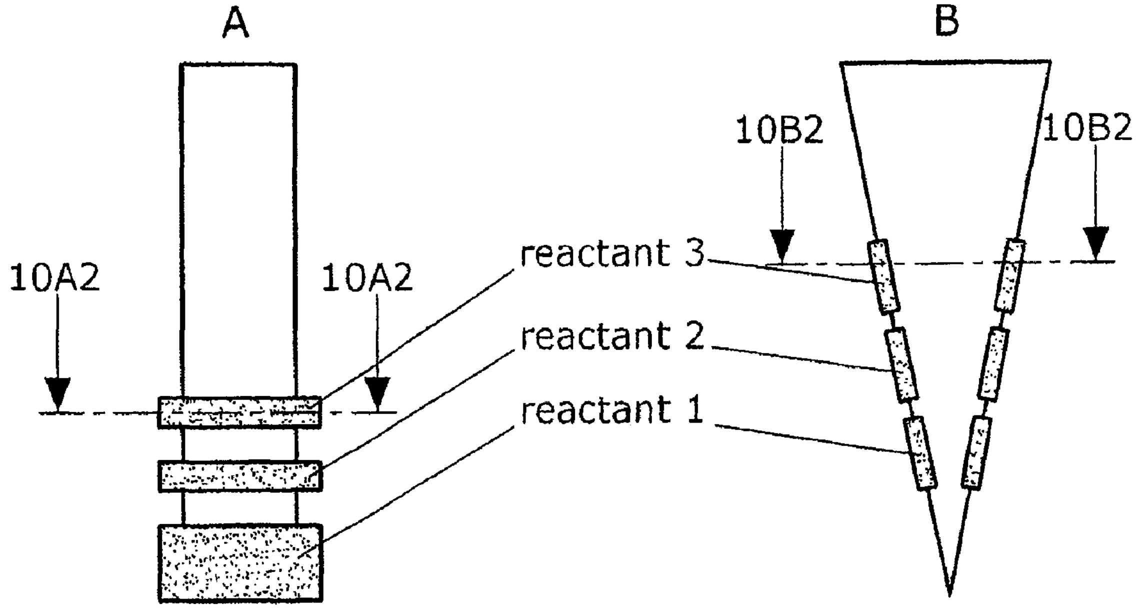
FIG. 10 shows a schematic sketch in which different reactants (1, 2, 3) are bound to different surface regions 20 of a molded part designed as a rod (A) or pipette tip (B) having an interior region 10, and a molded part designed as a tube (c), single vessel (d), multiple vessel (e), sphere (f), and plate (g).
Figure 10:
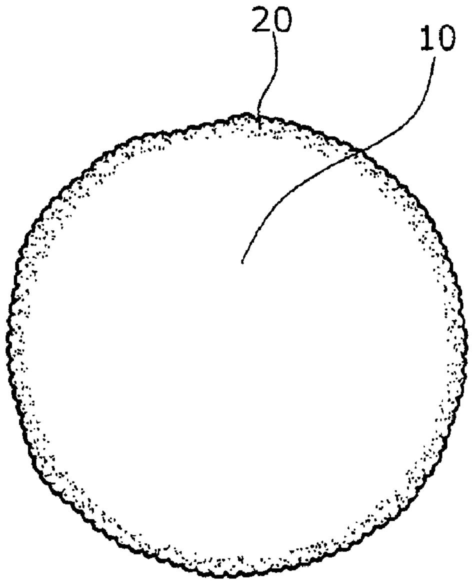
Figure 10:
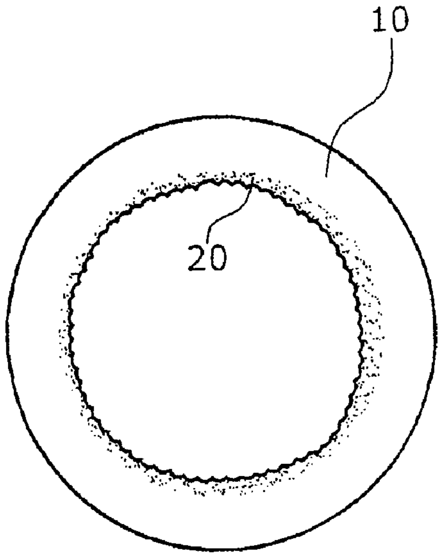
Figure 10G:
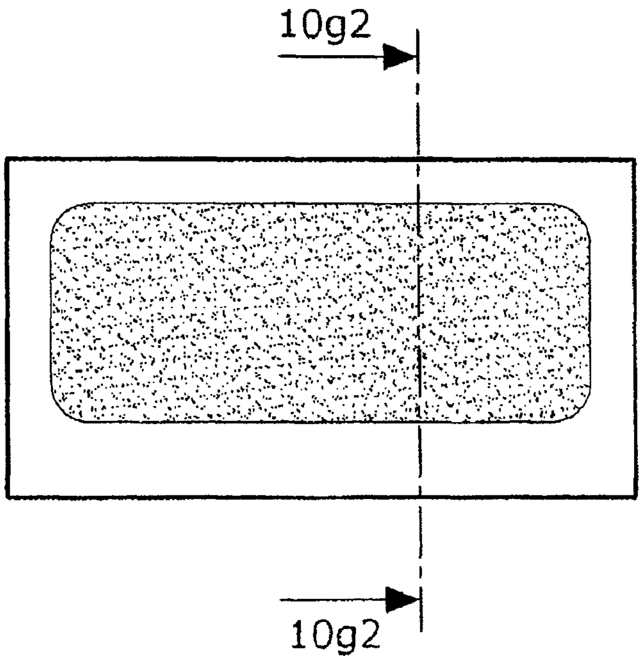
Figure 10G:
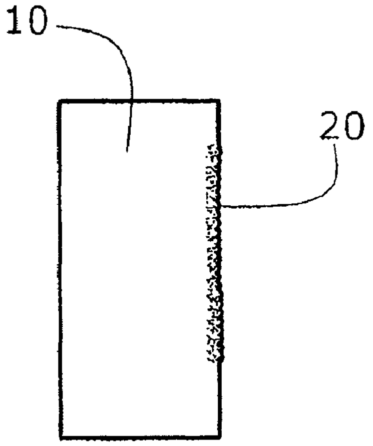
Figure 11:
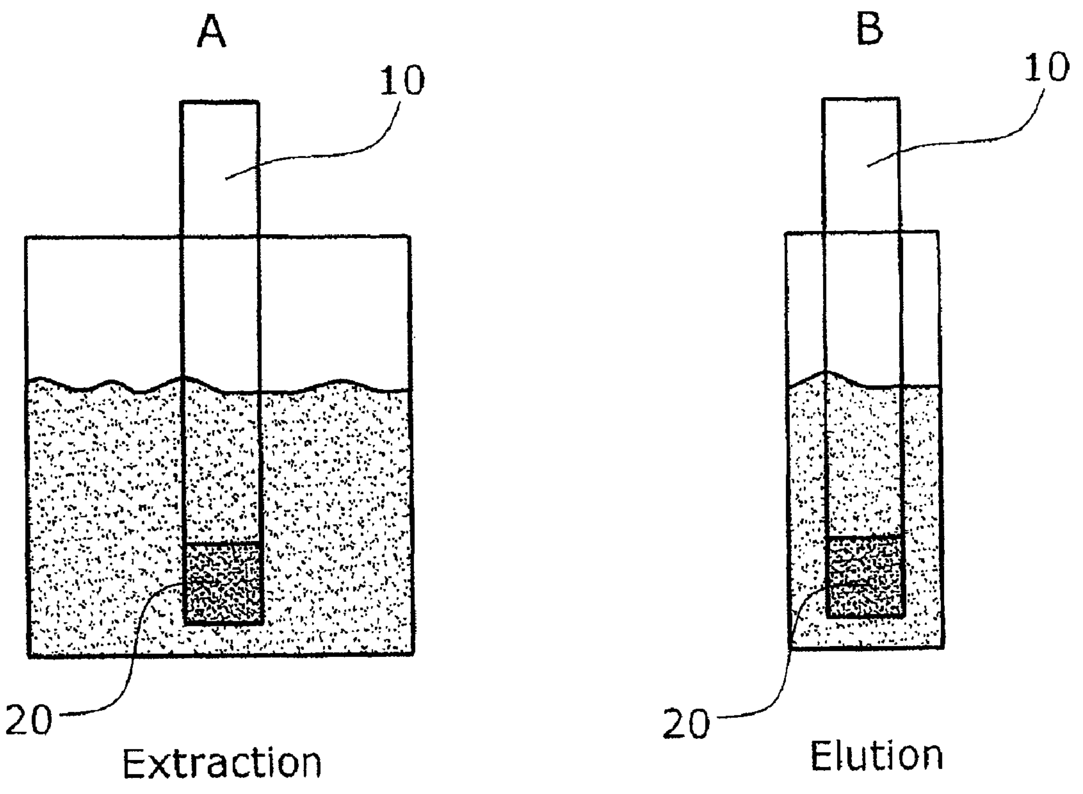
FIG. 11 shows a sketch of an application of the molded parts according to the invention in which the extraction (A) and elution (B) is effected in different volumes in order to achieve concentration of the substances.

FIG. 9 shows the negative MALDI spectra of A) the mixture of phosphopeptide with HSA peptides and B) after elution from the metal chelate nylon rod.

The invention claimed is:

1. An apparatus comprising:

an integral molded part of a plastic material for the analysis and preparation of substances, the apparatus having at least one surface region and an interior region, wherein the molded part consists of one chemically unitary starting material, and wherein said at least one surface region is an open-pore three dimensional network, and wherein said interior region has no open pores.

2. The apparatus according to claim 1, wherein said plastic material is selected from the group consisting of polyamides, polysulfones, polyesters, polycarbonates, and copolymers thereof.

3. The apparatus according to claim 1 wherein at least one reactant is bound to at least a part of said at least one surface region.

4. The apparatus according to claim 3, wherein said reactant is selected from the group consisting of proteins, nucleic acids, carbohydrates, lipids, affinity-ligands and effectors of enzymes.

5. The apparatus according to claim 3 or claim 4 wherein said reactant is bound through a reactive side chain of said plastic material.

6. The apparatus according to claim 1 wherein said molded part is at least one of a pipette tip, microtitration plate, piece of flexible tubing, rod, single or multiple vessel, immersed body sphere or plate.

7. A process for the preparation of an integral molded part of a plastic material, wherein the molded part consists of one chemically unitary starting material, and the molded part having at least one surface region and an interior region, the process comprising: partially dissolving the plastic material on at least a part of the at least one surface region to form an open-pore surface region which is a three-dimensional network, and wherein said interior region has no open pores.

8. The process according to claim 7, further comprising chemically activating the surface region before, simultaneously with or after partially dissolving the surface region.

9. An integral molded part of a plastic material having at least one surface region and having an interior region, the surface region obtainable by a process comprising: partially dissolving the plastic material on at least a part of the at least one surface region to form an open-pore surface region which is a three-dimensional network, and wherein said interior region has no open pores.

* * * * *